United States Patent
Yu (10) Patent No.: US 8,520,163 B2
(45) Date of Patent: Aug. 27, 2013

(54) LIGHT SOURCE ASSEMBLY AND LCD

(75) Inventor: Gang Yu, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 129 days.

(21) Appl. No.: 13/318,350

(22) PCT Filed: May 26, 2011

(86) PCT No.: PCT/CN2011/074735
§ 371 (c)(1),
(2), (4) Date: Oct. 31, 2011

(87) PCT Pub. No.: WO2012/109827
PCT Pub. Date: Aug. 23, 2012

(65) Prior Publication Data
US 2012/0212688 A1   Aug. 23, 2012

(30) Foreign Application Priority Data
Feb. 18, 2011   (CN) .......................... 2011 1 0040771

(51) Int. Cl.
*G02F 1/1335* (2006.01)
(52) U.S. Cl.
USPC .......................... 349/61; 349/58; 362/217.17
(58) Field of Classification Search
None
See application file for complete search history.

(56) References Cited

U.S. PATENT DOCUMENTS
2002/0093815 A1 * 7/2002 Ou ................................ 362/109

* cited by examiner

*Primary Examiner* — Lucy Chien
(74) *Attorney, Agent, or Firm* — Cheng-Ju Chiang (57) ABSTRACT

The present invention provides a light source assembly, which comprises a light tube, a conductive nesting element, a first insulative insert and a second insulative insert. A nesting body of the conductive nesting element is fitted over and fixed to an end of a tube body of the light tube and is electrically connected to a pin of the light tube, and a flap of the conductive nesting element is disposed on the nesting body and extends in a direction lateral to the light tube. The first insulative insert is formed with a first through-hole and a blind hole. The nesting body is inserted through the first through-hole, and the flap is disposed and supported in the blind hole from a side away from the light tube. The second insulative insert comprises an insulative body and a conductive elastic piece disposed inside the insulative body. Both ends of the conductive elastic piece are exposed from two opposite sides of the insulative body, and one end of the conductive elastic piece abuts against the flap located in the blind hole. The present invention further provides a liquid crystal display (LCD). With the above arrangement, damage to the light tube is prevented when a lead is welded onto the pin of the light tube, so the light source assembly and the LCD of the present invention can save the cost.

20 Claims, 5 Drawing Sheets

LIGHT SOURCE ASSEMBLY AND LCD

TECHNICAL FIELD

The present invention generally relates to a light source assembly, and more particularly, to a light source assembly for a liquid crystal display (LCD) and the LCD.

BACKGROUND

As liquid crystal displays (LCDs) have such advantages as lightweight, low-profile and no radiation, they are widely used in modern information apparatuses such as notebook computers, flat panel TVs and personal digital assistants (PDAs). Because liquid crystal panels in the LCDs do not emit light by themselves, the LCDs must be provided with light sources in order to accomplish the displaying function.

Figure 1:
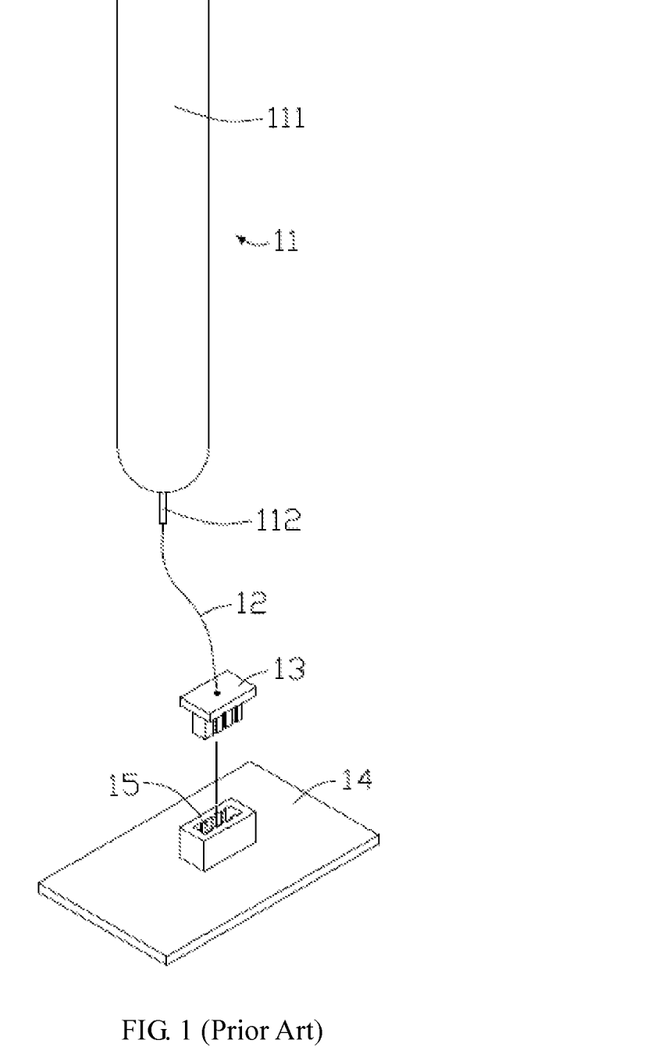
FIG. 1 is a schematic perspective view of a light source assembly for an LCD in the prior art.

Referring to FIG. 1, there is shown a schematic perspective view of a light source assembly for an LCD in the prior art. As shown in FIG. 1, the light source assembly comprises a light tube 11, a lead 12 and a connector 13. The light tube 11 comprises a tube body 111 and a pin 112 disposed at an end of the tube body 111. The lead 12 has an end welded onto the pin 112 and the other end connected to the connector 13. The connector 13 is further connected to an external connector 15 on a circuit board 14. However, in the process of welding the lead 12 onto the pin 112, glass of the tube body 111 tends to be thermally damaged due to a high temperature of the soldering iron. This may lead to gas leakage from the tube body 111 to cause failure of the light tube 11. In this case, the damaged light tube 11 must be replaced with a new one and the welding process must be repeated, thus increasing the cost.

Therefore, a need exists in the art to provide a light source assembly and an LCD which can solve the problem with the prior art light source assembly that the light tube tends to be damaged when the lead is welded.

SUMMARY OF THE DISCLOSURE

The primary objective of the present invention is to provide a light source assembly and a liquid crystal display (LCD), which can prevent a light tube from being damaged when a lead is welded so as to save the cost.

To achieve the aforesaid objective, the present invention provides a light source assembly, which comprises a light tube, a conductive nesting element, a first insulative insert, a second insulative insert and a lead. The light tube comprises a tube body and a pin, wherein the pin is disposed at an end of the tube body. The conductive nesting element comprises a nesting body and a flap, wherein the nesting body is fitted over and fixed to an end of the tube body and is electrically connected to the pin, and the flap is disposed on the nesting body and extends in a direction lateral to the light tube. The first insulative insert is formed with a first through-hole, a second through-hole and a blind hole, wherein the first through-hole connects two opposite sides of the first insulative insert, the second through-hole connects to the first through-hole and connects the two opposite sides of the first insulative insert, the blind hole connects to the first through-hole and connects one of the sides of the first insulative insert that is away from the light tube, the first through-hole is disposed to allow the nesting body to pass through the first insulative insert, the second through-hole is disposed to allow the flap to pass through the first insulative insert, and the blind hole is disposed to allow the flap to be disposed and supported in the blind hole from a side away from the light tube. The second insulative insert is fixed on the first insulative insert, wherein the second insulative insert comprises an insulative body and a conductive elastic piece disposed inside the insulative body, both ends of the conductive elastic piece are exposed from two opposite sides of the insulative body, and one end of the conductive elastic piece abuts against the flap located in the blind hole. The lead has an end electrically connected to the other end of the conductive elastic piece.

According to a preferred embodiment of the present invention, the second insulative insert further comprises an upright post disposed on a side surface of the insulative body near the light tube, and the upright post is inserted and fixed into the second through-hole.

According to a preferred embodiment of the present invention, the nesting body comprises a first bushing and a second bushing, the first bushing is fitted over an end of the tube body, the second bushing is fitted over the pin and is press-fitted to the pin, and the flap is disposed on the first bushing.

To achieve the aforesaid objective, the present invention further provides a light source assembly, which comprises a light tube, a conductive nesting element, a first insulative insert and a second insulative insert. The light tube comprises a tube body and a pin, wherein the pin is disposed at an end of the tube body. The conductive nesting element comprises a nesting body and a flap, wherein the nesting body is fitted over and fixed to an end of the tube body and is electrically connected to the pin, and the flap is disposed on the nesting body and extends in a direction lateral to the light tube. The first insulative insert is formed with a first through-hole and a blind hole, wherein the first through-hole connects two opposite sides of the first insulative insert to allow the nesting body to be inserted through the first through-hole, and the blind hole connects to the first through-hole and connects one of the sides of the first insulative insert that is away from the light tube to allow the flap to be disposed and supported in the blind hole from a side away from the light tube. The second insulative insert is fixed on the first insulative insert, wherein the second insulative insert comprises an insulative body and a conductive elastic piece disposed inside the insulative body, both ends of the conductive elastic piece are exposed from two opposite sides of the insulative body, and one end of the conductive elastic piece abuts against the flap located in the blind hole.

According to a preferred embodiment of the present invention, the first insulative insert is further formed with a second through-hole, the second through-hole connects to the first through-hole and connects the two opposite sides of the first insulative insert, the first through-hole is disposed to allow the nesting body to pass through the first insulative insert, and the second through-hole is disposed to allow the flap to pass through the first insulative insert.

According to a preferred embodiment of the present invention, the second insulative insert further comprises an upright post disposed on a side surface of the insulative body near the light tube, and the upright post is inserted and fixed into the second through-hole.

According to a preferred embodiment of the present invention, the upright post is interference-fitted into the second through-hole.

According to a preferred embodiment of the present invention, there are two flaps, second through-holes, blind holes, elastic pieces and upright posts respectively.

According to a preferred embodiment of the present invention, the flaps are disposed at two opposite sides of the nesting body respectively, and the second through-holes and the blind holes are arranged in the form of a cross with the first through-hole as a center.

According to a preferred embodiment of the present invention, the flaps, the second through-holes and the blind holes have a rectangular section in a direction perpendicular to the tube body.

According to a preferred embodiment of the present invention, the light source assembly further comprises a lead, which has an end electrically connected to the other end of the conductive elastic piece.

According to a preferred embodiment of the present invention, the light source assembly further comprises a connector, which is electrically connected to the other end of the lead.

According to a preferred embodiment of the present invention, the nesting body comprises a first bushing and a second bushing, the first bushing is fitted over an end of the tube body, and the second bushing is fitted over and press-fitted to the pin.

To achieve the aforesaid technical problem, the present invention further provides an LCD comprising a light source assembly, wherein the light source assembly further comprises a light tube, a conductive nesting element, a first insulative insert and a second insulative insert. The light tube comprises a tube body and a pin, wherein the pin is disposed at an end of the tube body. The conductive nesting element comprises a nesting body and a flap, wherein the nesting body is fitted over and fixed to an end of the tube body and is electrically connected to the pin, and the flap is disposed on the nesting body and extends in a direction lateral to the light tube. The first insulative insert is formed with a first through-hole and a blind hole, wherein the first through-hole connects two opposite sides of the first insulative insert to allow the nesting body to be inserted through the first through-hole, and the blind hole connects to the first through-hole and connects one of the sides of the first insulative insert that is away from the light tube to allow the flap to be disposed and supported in the blind hole from a side away from the light tube. The second insulative insert is fixed on the first insulative insert, wherein the second insulative insert comprises an insulative body and a conductive elastic piece disposed inside the insulative body, both ends of the conductive elastic piece are exposed from two opposite sides of the insulative body, and one end of the conductive elastic piece abuts against the flap located in the blind hole.

According to a preferred embodiment of the present invention, the first insulative insert is further formed with a second through-hole, the second through-hole connects to the first through-hole and connects the two opposite sides of the first insulative insert, the first through-hole is disposed to allow the nesting body to pass through the first insulative insert, and the second through-hole is disposed to allow the flap to pass through the first insulative insert.

According to a preferred embodiment of the present invention, the second insulative insert further comprises an upright post disposed on a side surface of the insulative body near the light tube, and the upright post is inserted and fixed into the second through-hole.

According to a preferred embodiment of the present invention, the upright post is interference-fitted into the second through-hole.

According to a preferred embodiment of the present invention, the light source assembly further comprises a lead, which has an end electrically connected to the other end of the conductive elastic piece.

According to a preferred embodiment of the present invention, the light source assembly further comprises a connector, which is electrically connected to the other end of the lead.

According to a preferred embodiment of the present invention, the nesting body comprises a first bushing and a second bushing, the first bushing is fitted over an end of the tube body, and the second bushing is fitted over and press-fitted to the pin.

The present invention has the following benefits: as compared to the prior art, the light source assembly and the LCD of the present invention can prevent damage to the light tube when the lead is welded onto the pin of the light tube, so they can save the cost.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present disclosure in detail.

Referring to FIG. 2 to FIG. 5, a light source assembly of the present invention mainly comprises a light tube 21, a conductive nesting element 22, a first insulative insert 23, a second insulative insert 24, leads 25 and a connector 26.

Figure 2:
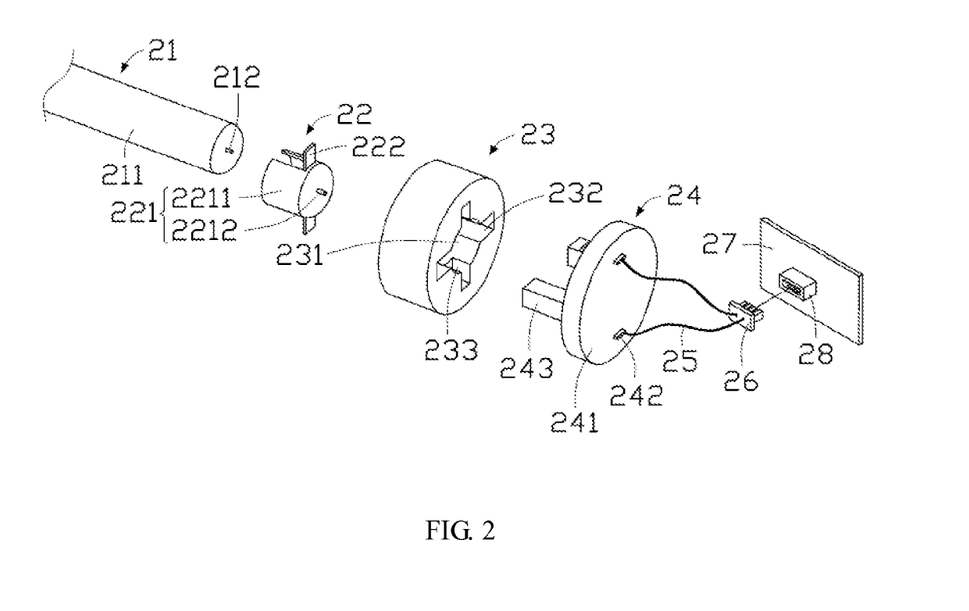
FIG. 2 is a schematic perspective view of a light source assembly according to a first embodiment of the present invention in an exploded status.

The light tube 21 comprises a tube body 211 and a pin 212, and the pin 212 is disposed at an end of the tube body 211. In this embodiment, the light tube 21 may be a cold cathode fluorescence lamp (CCFL) tube well known in the art.

The conductive nesting element 22 comprises a nesting body 221 and flaps 222. The nesting body 221 is fitted over and fixed to an end of the tube body 211 and is electrically connected to the pin 212. Specifically, in this embodiment, the nesting body 221 comprises a first bushing 2211 and a second bushing 2212, the first bushing 2211 is fitted over an end of the tube body 211, and the second bushing 2212 is fitted over and press-fitted to the pin 212. The nesting body 221 may also be fixed to the end of the tube body 211 and be electrically connected to the pin 212 in other ways; e.g., the nesting body 221 may be glued to the end of the tube body 211 and be electrically connected to the pin 212 by making a contact with the pin 212.

The flaps 222 are disposed on the nesting body 221 and extend in a direction lateral to the light tube 21. Preferably, the flaps 222 are integrally formed with the nesting body 221. Specifically, in this embodiment, each of the flaps 222 is formed by cutting a strip-like area on a side wall of the first bushing 2211 and then bending the strip-like area in the direction lateral to the light tube 21. The flaps 222 may also be formed and disposed on the nesting body 221 in other ways; e.g., the flaps 222 may be formed as separate conductive components in an appropriate way, and then fixed to the nesting body 221 through welding or in other ways. In this embodiment, there are two flaps 222, which are formed at two sides of the nesting body 221 respectively. Meanwhile, the flaps 222 have a rectangular cross-section in a direction perpendicular to the tube body 211. In other embodiments, there may also be one or more than two flaps 222 depending on practical requirements, and the flaps 222 may also be designed to have other shapes depending on practical requirements.

Figure 3:
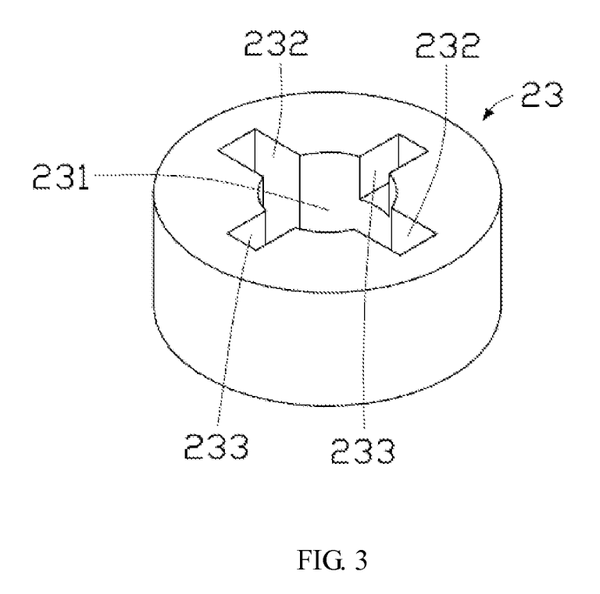
FIG. 3 is a schematic perspective view of a first insulative insert in the light source assembly of FIG. 2.

The first insulative insert 23 is formed with a first through-hole 231, second through-holes 232 and blind holes 233. The first through-hole 231 connects two opposite sides of the first insulative insert 23 (an upper side and a lower side of the first insulative insert 23 as shown in FIG. 3) to allow the nesting body 221 to be inserted through the first through-hole 231. The first through-hole 231 further allows the nesting body 221 to pass through the first insulative insert 23. Each of the second through-holes 232 connects to the first through-hole 231 and connects the two opposite sides of the first insulative insert 23 (the upper side and the lower side of the first insulative insert 23 as shown in FIG. 3) to allow the flaps 222 to pass through the first insulative insert 23. Each of the blind holes 233 connects to the first through-hole 231 and connects one of the sides of the first insulative insert 23 that is away from the light tube 21 (the upper side of the first insulative insert 23 as shown in FIG. 3) to allow the flaps 222 to be disposed and supported in the blind hole 233 from the side away from the light tube 21. Preferably, the flaps 222 and the blind holes 233 are closely fitted with each other. In this embodiment, corresponding to the number of the flaps 222, the numbers of the second through-holes 232 and the blind holes 233 are also two respectively; and the second through-holes 232 and the blind holes 233 are arranged in the form of a cross with the first through-hole 231 as a center. Meanwhile, the second through-holes 232 and the blind holes 233 also have a rectangular cross-section in the direction perpendicular to the tube body 211. In other embodiments, the numbers and the shapes of the second through-holes 232 and the blind holes 233 may vary depending on the number and the shape of the flaps 222.

Figure 4:
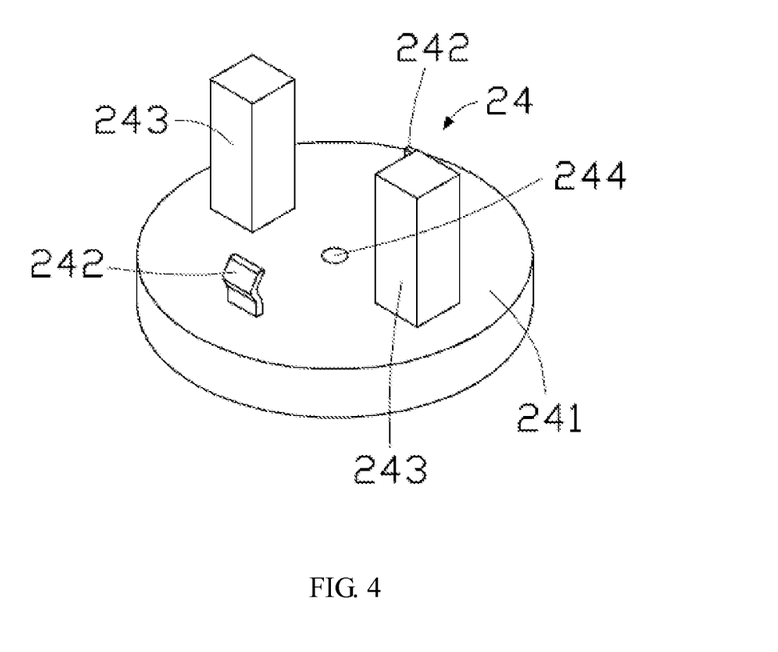
FIG. 4 is a schematic perspective view of a second insulative insert in the light source assembly of FIG. 2.
Figure 5:
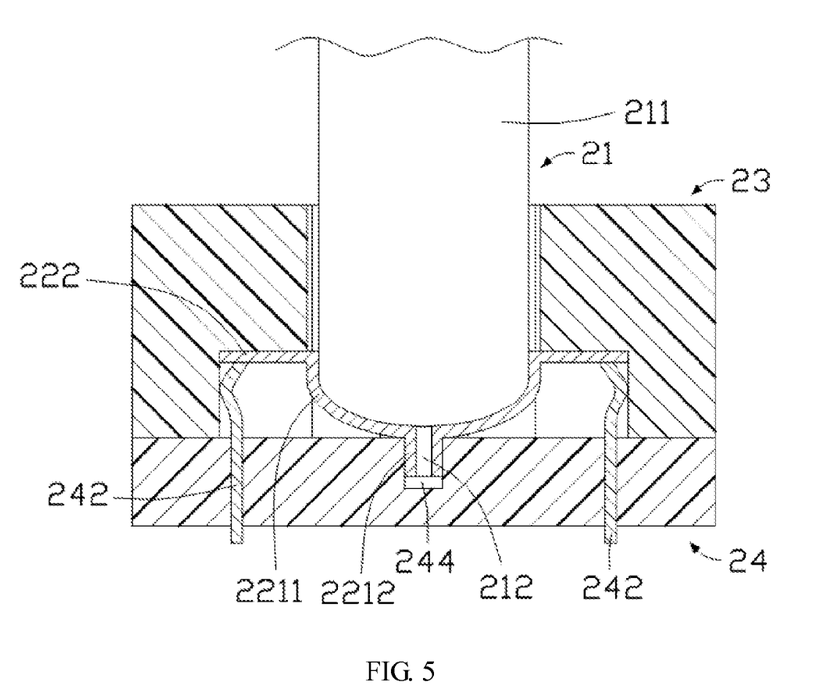
FIG. 5 is a cross-sectional view of the light source assembly of FIG. 2 in an assembled status.

The second insulative insert 24 comprises an insulative body 241, conductive elastic pieces 242 and upright posts 243. The conductive elastic pieces 242 are disposed inside the insulative body 241, and both ends of each of the conductive elastic pieces 242 are exposed from two opposite sides of the insulative body 241. The conductive elastic pieces 242 may be disposed inside the insulative body 241 through injection moulding. The upright posts 243 are disposed on a side surface of the insulative body 241 near the light tube 21, and each of the upright posts 243 is inserted and fixed into one of the second through-holes 232 so that the second insulative insert 24 is fixed to the first insulative insert 23. The upright posts 243 may be integrally formed with the insulative body 241 through injection moulding. When the second insulative insert 24 is fixed to the first insulative insert 23, one end of each of the conductive elastic pieces 242 abuts against one of the flaps 222 located in the blind holes 233. In a preferred embodiment, the upright posts 243 are interference-fitted into the second through-holes 232. In other embodiments, the second insulative insert 24 may also be fixed to the first insulative insert 23 in other ways, for example, through gluing, snap-fitting or screwing. Furthermore, each of the conductive elastic pieces 242 preferably has a bent structure at an end thereof to elastically abut against one of the flaps 222. In this embodiment, corresponding to the numbers of the second through-holes 232 and the flaps 222, the numbers of the upright posts 243 and the conductive elastic pieces 242 are also two respectively; meanwhile, the upright posts 243 also have a rectangular cross-section in the direction perpendicular to the tube body 211. In other embodiments, the numbers of the upright posts 243 and the conductive elastic pieces 242 and the shape of the upright posts 243 may vary depending on the numbers and shapes of the second through-holes 232 and the flaps 222.

In this embodiment, the side surface of the insulative body 241 near the light tube 21 is further formed with a blind hole 244, which is adapted to receive the pin 212 of the light tube 21 and the second bushing 2212 of the conductive nesting element 22. This can shorten the length of the first insulative insert 23.

An end of each of the leads 25 is electrically connected to the other end of one of the conductive elastic pieces 242 through welding or in other ways. The connector 26 is electrically connected to the other end of each of the leads 25 through welding or in other ways. The connector 26 is further connected to an external connector 28 disposed on a circuit board 27.

Hereinafter, an assembling process of the light source assembly will be described in detail.

Firstly, the nesting body 221 of the conductive nesting element 22 is fitted over and fixed to an end of the tube body 211 and is electrically connected to the pin 212. Then, the nesting body 221 and the flaps 222 of the conductive nesting element 22 are inserted through the first insulative insert 23 via the first through-hole 231 and the second through-holes 232 respectively. Next, the conductive nesting element 22 is rotated by 90°, and the flaps 222 are disposed and supported in the blind holes 233 from a side of the first insulative insert 23 away from the light tube 21. Then, the upright posts 243 of the second insulative insert 24 are inserted and fixed into the second through-holes 232, with one end of each of the conductive elastic pieces 242 abutting against one of the flaps 222 located in the blind holes 233. Finally, an end of each of the leads 25 is electrically connected to the other end of one of the conductive elastic pieces 242, and the other end of each of the leads 25 is electrically connected to the connector 26.

In the present invention, the second through-holes 232 and the upright posts 243 may also be omitted. In this case, firstly, the first insulative insert 23 is fitted over the tube body 211 via the first through-hole 231, and then the nesting body 221 of the conductive nesting element 22 is fitted over and fixed to an end of the tube body 211. Next, the nesting body 221 is inserted through the first through-hole 231 from a side of the first insulative insert 23 away from the light tube 21, and the flaps 222 are disposed and supported in the blind holes 233. Then, the insulative body 241 of the second insulative insert 24 is fixed to the first insulative insert 23 in other ways (e.g., through gluing, snap-fitting or screwing), with one end of each of the conductive elastic pieces 242 abutting against one of the flaps 222 located in the blind holes 233.

The present invention further provides a liquid crystal display (LCD), which comprises the light source assembly described in the aforesaid embodiment.

With the above arrangement, because the leads 25 are welded onto the conductive elastic pieces 242, damage to the light tube can be prevented when a lead is welded onto the pin of the light tube. Therefore, the light source assembly and the LCD of the present invention can save the cost.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A light source assembly, comprising:
    a light tube, comprising a tube body and a pin, wherein the pin is disposed at an end of the tube body;
    a conductive nesting element, comprising a nesting body and a flap, wherein the nesting body is fitted over and fixed to an end of the tube body and is electrically connected to the pin, and the flap is disposed on the nesting body and extends in a direction lateral to the light tube;
    a first insulative insert, being formed with a first through-hole, a second through-hole and a blind hole, wherein the first through-hole connects two opposite sides of the first insulative insert, the second through-hole connects to the first through-hole and connects the two opposite sides of the first insulative insert, the blind hole connects to the first through-hole and connects one of the sides of the first insulative insert that is away from the light tube, the first through-hole is disposed to allow the nesting body to pass through the first insulative insert, the second through-hole is disposed to allow the flap to pass through the first insulative insert, and the blind hole is disposed to allow the flap to be disposed and supported in the blind hole from a side away from the light tube;
    a second insulative insert fixed on the first insulative insert, wherein the second insulative insert comprises an insulative body and a conductive elastic piece disposed inside the insulative body, both ends of the conductive elastic piece are exposed from two opposite sides of the insulative body, and one end of the conductive elastic piece abuts against the flap located in the blind hole; and
    a lead, having an end electrically connected to the other end of the conductive elastic piece.

2. The light source assembly of claim 1, wherein the second insulative insert further comprises an upright post disposed on a side surface of the insulative body near the light tube, and the upright post is inserted and fixed into the second through-hole.

3. The light source assembly of claim 1, wherein the nesting body comprises a first bushing and a second bushing, the first bushing is fitted over an end of the tube body, the second bushing is fitted over and press-fitted to the pin, and the flap is disposed on the first bushing.

4. A light source assembly, comprising:
    a light tube, comprising a tube body and a pin, wherein the pin is disposed at an end of the tube body;
    a conductive nesting element, comprising a nesting body and a flap, wherein the nesting body is fitted over and fixed to an end of the tube body and is electrically connected to the pin, and the flap is disposed on the nesting body and extends in a direction lateral to the light tube;
    a first insulative insert, being formed with a first through-hole and a blind hole, wherein the first through-hole connects two opposite sides of the first insulative insert to allow the nesting body to be inserted through the first through-hole, and the blind hole connects to the first through-hole and connects one of the sides of the first insulative insert that is away from the light tube to allow the flap to be disposed and supported in the blind hole from a side away from the light tube; and
    a second insulative insert fixed on the first insulative insert, wherein the second insulative insert comprises an insulative body and a conductive elastic piece disposed inside the insulative body, both ends of the conductive elastic piece are exposed from two opposite sides of the insulative body, and one end of the conductive elastic piece abuts against the flap located in the blind hole.

5. The light source assembly of claim 4, wherein the first insulative insert is further formed with a second through-hole, the second through-hole connects to the first through-hole and connects the two opposite sides of the first insulative insert, the first through-hole is disposed to allow the nesting body to pass through the first insulative insert, and the second through-hole is disposed to allow the flap to pass through the first insulative insert.

6. The light source assembly of claim 5, wherein the second insulative insert further comprises an upright post disposed on a side surface of the insulative body near the light tube, and the upright post is inserted and fixed into the second through-hole.

7. The light source assembly of claim 6, wherein the upright post is interference-fitted into the second through-hole.

8. The light source assembly of claim 6, wherein there are two flaps, second through-holes, blind holes, elastic pieces and upright posts respectively.

9. The light source assembly of claim 8, wherein the flaps are disposed at two opposite sides of the nesting body respectively, and the second through-holes and the blind holes are arranged in the form of a cross with the first through-hole as a center.

10. The light source assembly of claim 8, wherein the flaps, the second through-holes and the blind holes have a rectangular section in a direction perpendicular to the tube body.

11. The light source assembly of claim 4, wherein the light source assembly further comprises a lead, which has an end electrically connected to the other end of the conductive elastic piece.

12. The light source assembly of claim 11, wherein the light source assembly further comprises a connector, which is electrically connected to the other end of the lead.

13. The light source assembly of claim 4, wherein the nesting body comprises a first bushing and a second bushing, the first bushing is fitted over an end of the tube body, and the second bushing is fitted over the pin and is press-fitted to the pin.

14. A liquid crystal display (LCD), comprising a light source assembly, the light source assembly comprising:
    a light tube, comprising a tube body and a pin, wherein the pin is disposed at an end of the tube body;
    a conductive nesting element, comprising a nesting body and a flap, wherein the nesting body is fitted over and is fixed to an end of the tube body and is electrically connected to the pin, and the flap is disposed on the nesting body and extends in a direction lateral to the light tube;
    a first insulative insert, being formed with a first through-hole and a blind hole, wherein the first through-hole connects two opposite sides of the first insulative insert to allow the nesting body to be inserted through the first through-hole, and the blind hole connects to the first through-hole and connects one of the sides of the first insulative insert that is away from the light tube to allow the flap to be disposed and supported in the blind hole from a side away from the light tube; and
    a second insulative insert fixed on the first insulative insert, wherein the second insulative insert comprises an insulative body and a conductive elastic piece disposed inside the insulative body, both ends of the conductive elastic piece are exposed from two opposite sides of the insulative body, and one end of the conductive elastic piece abuts against the flap located in the blind hole.

15. The LCD of claim 14, wherein the first insulative insert is further formed with a second through-hole, the second through-hole connects to the first through-hole and connects the two opposite sides of the first insulative insert, the first through-hole is disposed to allow the nesting body to pass through the first insulative insert, and the second through-hole is disposed to allow the flap to pass through the first insulative insert.

16. The LCD of claim 15, wherein the second insulative insert further comprises an upright post disposed on a side surface of the insulative body near the light tube, and the upright post is inserted and fixed into the second through-hole.

17. The LCD of claim 16, wherein the upright post is interference-fitted into the second through-hole.

18. The LCD of claim 14, wherein the light source assembly further comprises a lead, which has an end electrically connected to the other end of the conductive elastic piece.

19. The LCD of claim 18, wherein the light source assembly further comprises a connector, which is electrically connected to the other end of the lead.

20. The LCD of claim 14, wherein the nesting body comprises a first bushing and a second bushing, the first bushing is fitted over an end of the tube body, and the second bushing is fitted over the pin and is press-fitted to the pin.

\* \* \* \* \*